United States Patent [19]

Domurat

[11] Patent Number: 5,195,270

[45] Date of Patent: Mar. 23, 1993

[54] FLORAL STAND

[76] Inventor: Kevin X. Domurat, 4135 Dixie Canyon Ave., Sherman Oaks, Calif. 91423

[21] Appl. No.: 743,218

[22] Filed: Aug. 9, 1991

[51] Int. Cl.$^5$ .............................................. A01G 5/00
[52] U.S. Cl. .................................................. 47/41.01
[58] Field of Search ............... 47/41.01, 41.11, 41.1, 47/41.12, 41.13, 41.15

[56] References Cited

U.S. PATENT DOCUMENTS

| 427,402 | 5/1890 | Christie | 47/41.12 |
| 720,132 | 2/1903 | Green | 47/41.11 |
| 2,486,848 | 11/1949 | Huck | 47/41.01 |
| 2,747,333 | 5/1956 | Erbguth | 47/41.13 |
| 2,779,459 | 1/1957 | Waterman | 47/41.11 |
| 2,904,932 | 9/1959 | Seewann | 47/41.01 |
| 4,165,835 | 8/1979 | Dearling | 47/41.01 |
| 4,958,461 | 9/1990 | Aldrich | 47/41.11 |

FOREIGN PATENT DOCUMENTS

| 47680 | 8/1933 | Denmark | 47/41.11 |
| 156466 | 9/1903 | Fed. Rep. of Germany | 47/41.11 |
| 280851 | 12/1913 | Fed. Rep. of Germany | 47/41 |
| 758427 | 1/1934 | France | 47/41.5 |
| 808385 | 2/1937 | France | 47/41.11 |
| 2373258 | 8/1978 | France | 47/41.12 |
| 18701 | of 1898 | United Kingdom | 47/41.15 |
| 23881 | of 1911 | United Kingdom | 47/41.15 |
| 846794 | 8/1960 | United Kingdom | 47/41.13 |
| 2191692 | 12/1987 | United Kingdom . | |

Primary Examiner—David A. Scherbel
Assistant Examiner—Michele A. Van Patten
Attorney, Agent, or Firm—Monty Koslover Assoc.

[57] ABSTRACT

A floral stand which is designed to display flower or branch arrangements in any desired orientation, including horizontally or upside down. The stand is a hollow shell made of a light weight plastic material, and having inside it porous material pads designed to hold water and plant food solution. Curved spring clips hold the porous pads in place and grip the flower or branch stems inserted between the clips, preventing the flowers or branches from falling out of the stand when held at an angle or upside down. The shell may be shaped in any of a number of pleasing configurations suitable for floral display. In addition, to the spring clips which can secure moderate sized flower stems and branches, specially designed pincers made of plastic material may be inserted inside the shell near its rim, to aid in gripping any heavy flower stems.

2 Claims, 3 Drawing Sheets

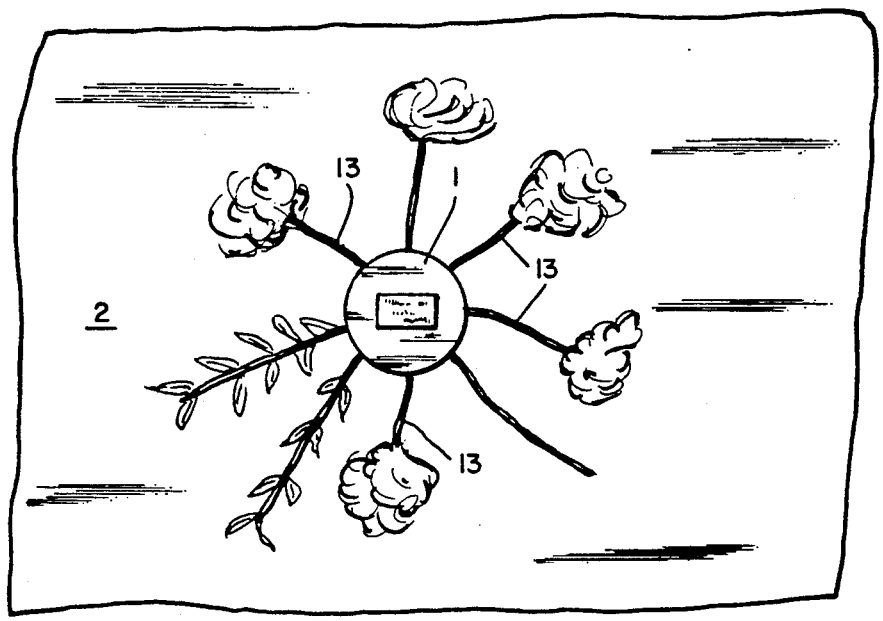
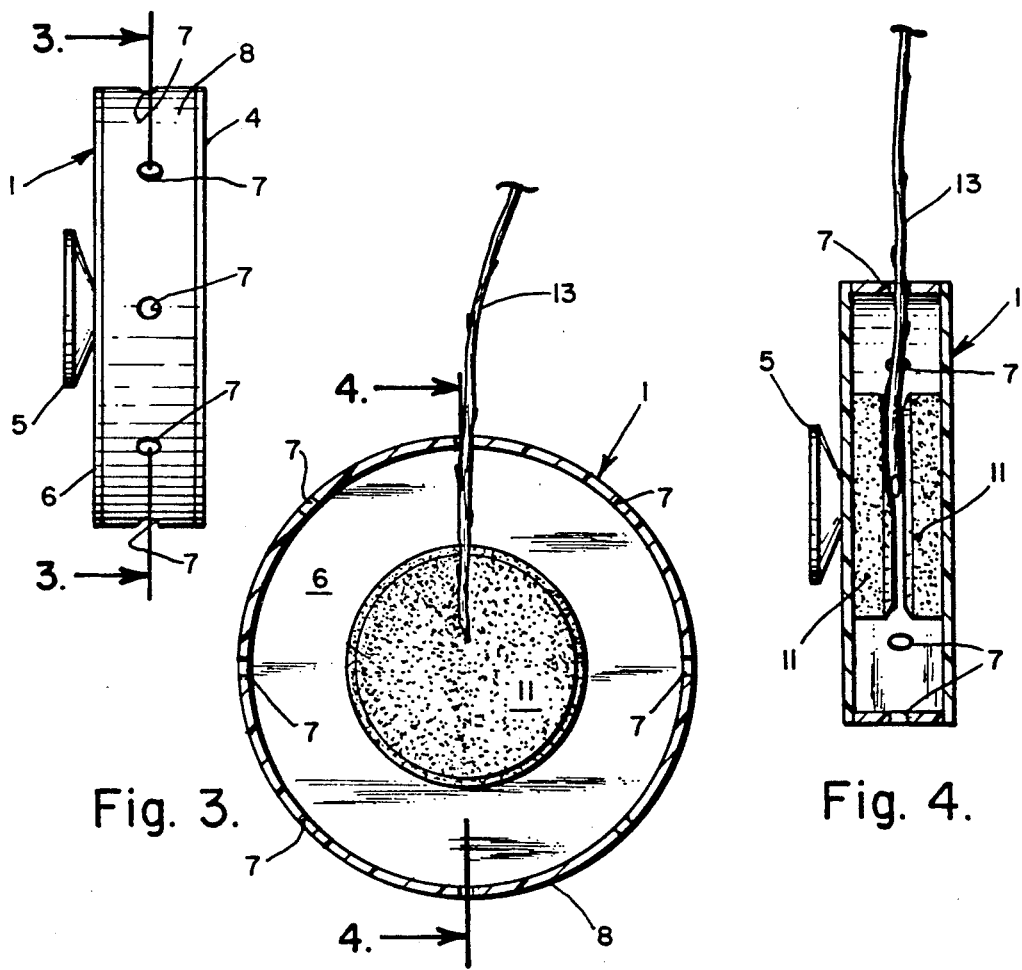

FLORAL STAND

BACKGROUND OF THE INVENTION

This invention relates to flower holding stands for flower and branch arrangement.

Many types of flower holders are known and available. Generally, these flower holders incorporate means for securing flower stems and branches so that they can be held upright and placed in a vase or dish. In some devices, the flower holder design is such that the flower stems and branches are permitted to protrude at angles near to horizontal from the vase. However, with few exceptions, the flower holders require the additional use of a vase or dish for watering the flowers and for display purposes.

In the available flower holder, the flowers or branches can not be arranged to hang upside down as could be the case if the holder and vase were mounted on a wall or window. In addition, the flower holders require vases or dishes having a shape and size the holders must be adapted to fit.

Considering the foregoing limitations, it would be advantageous to provide a flower holder which did not require a vase or dish and could be mounted in any desirable location for display, including vertically on a wall or window.

SUMMARY OF THE INVENTION

The present invention is a floral stand, which is similar to a vase in the sense that it is designed to display flower or branch arrangements. No additional vase or dish is required. The stand has an outer shell that may have a number of different configurations depending on where the stem or branch holes are placed, and the number of flower stems or branches to be displayed. Inside the outer shell is a core comprising angular spring strips and or branch pincers to hold the stems in place, and a sandwich of two layers of water porous material to hold moisture for watering the flowers. In each configuration, part of the flower stem is pushed between the porous layers so that it may be watered. The floral stand can be held in any manner with the flower stems or branches secured within its inner core and watering layers, even upside down.

Accordingly, it is a principal object of the present invention to provide a floral holder which does not require a vase or dish for support or watering.

Another object of this invention is to provide a simple device permitting flower and/or branch arrangements to be displayed in any desired location, whether vertically, with the flowers upside down or conventionally.

Yet another object of the invention is to provide a floral stand, which can be configured in numerous outer shell shapes, appealing to the needs of florists and flower arrangers.

Further objects and advantages of the present invention will become apparent from a study of the following portion of the specification, the claims and the attached drawings.

BRIEF DESCRIPTION OF THE DRAWINGS

FIG. 1 is a front view of the preferred embodiment of the present invention installed attached to a glass window, particularly showing how flowers and branches may be displayed upside down;

FIG. 2 is a side elevation view of the preferred embodiment of the present invention;

FIG. 3 is a cutaway plan view of the invention taken from the plane indicated by line 3—3 of FIG. 2, particularly showing how a stem may be held and watered by pads;

FIG. 4 is a cutaway side elevation view of the invention taken along the line 4—4 of FIG. 3, and particularly showing how a flower stem or branch is held in place and watered by two pads;

FIGS. 5 and 5a are perspective views of two different types of pincer devices which may be used to grasp a flower stem or branch as shown in FIG. 3a;

DESCRIPTION OF THE PREFERRED AND ALTERNATE EMBODIMENTS

Figure 6:
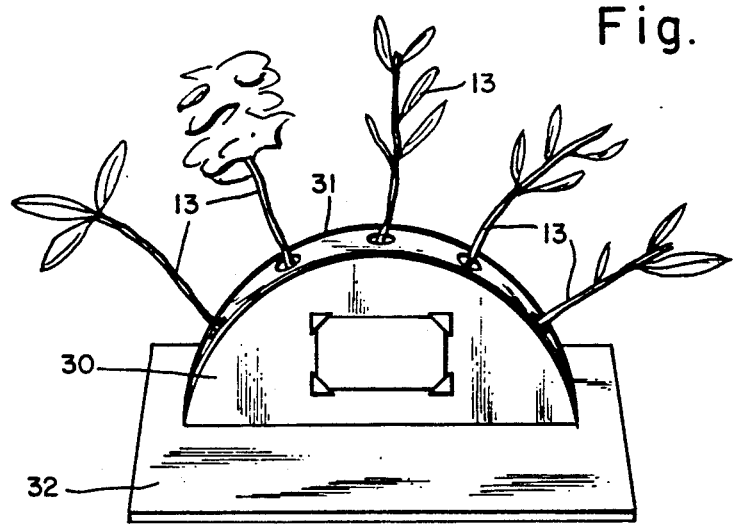
FIG. 6 is a front perspective view of an alternate embodiment of the present invention, particularly showing a configuration that is supported by a base.
Figure 7:
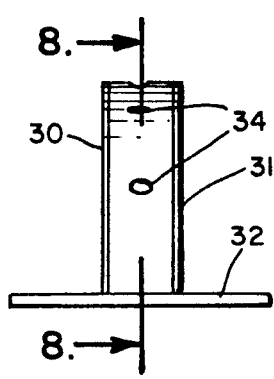
FIG. 7 is a side elevation view of the alternate embodiment of the present invention.
Figure 8:
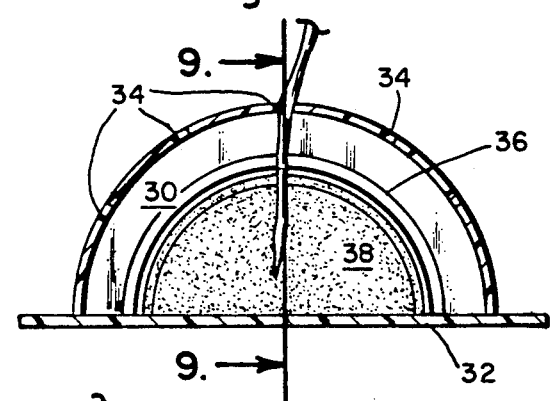
FIG. 8 is a cutaway plan view of the alternate embodiment taken from the plane indicated by line 8—8 of FIG. 7.
Figure 9:
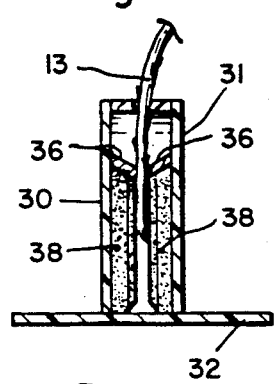
FIG. 9 is a cutaway side elevation view of the alternate embodiment taken from the plane indicated by line 9—9 of FIG. 8.

Referring particularly to the drawings there is shown in FIGS. 1, 2, 3 and 4 a preferred embodiment of the present invention floral stand. The floral stand configuration illustrated has a disk shaped shell 1. In FIG. 1 it is shown attached to a glass window or wall 2. The attachment means used is a suction cup 5, which is shown in FIG. 2.

As shown in FIG. 1, flower stems 3 and branches are held radially all around the circumference of the shell 1, with some of the flowers and branches extending downwards. This is made possible by a construction that provides a "vertical watering dish" equivalent and gripping means for the stems inside the shell 1.

FIGS. 2, 3 and 4 show the construction. The shell 1 is made from polystyrene plastic sheet or equivalent plastic material, cut into the requisite shapes and glued together to form the shell enclosure. For the configuration shown in FIG. 1, the shell pieces would be composed of two identical circular faces 4, 6, plus a circumferential strip 8. A multiplicity of hole 7 are cut in the circumferential strip 8, with each hole sized to accommodate a flower stem 3 or branch 13. Inside the shell 1 are located two circular pads 11 of porous material. Each pad 11 is centered in the device and glued to a circular face 4 or 6, of the shell. The pads have chamfered edges to help insertion of a stem between them, and are sized to leave a small separation between them for a stem when the shell 1 is assembled.

The porous pads 11 form a watering dish means which will function adequately even if held vertically. This is because the porous pads 11 absorb water or liquid plant food and feed moisture to the flower stems 13 and branches while gripping them tightly.

The porous pads 11 watering dish is watered through one or more of the stem holes 7 prior to arranging the flowers and branches. The configuration may also have a watering hole in the shell face, near to a porous pad 11 location. This is not shown on the drawings, but is an option.

Figure 3A:
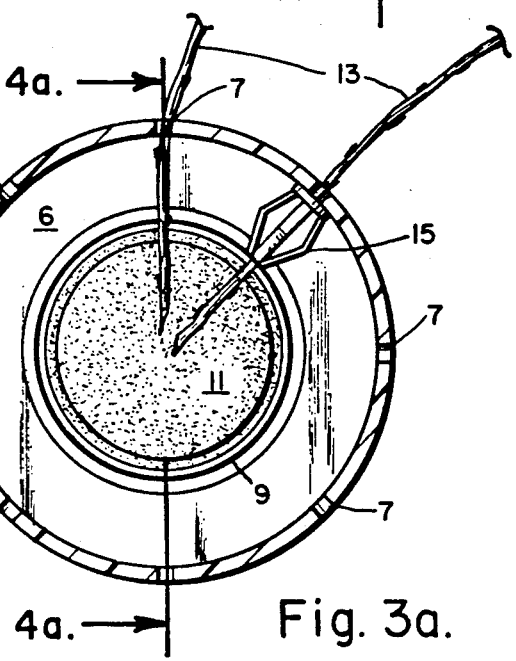
FIG. 3a is a cutaway plan view of the invention taken from the plane indicated by line 3—3 of FIG. 2, particularly showing a circular spring clip around the pads and the addition of a pincer device inside to assist in holding a stem or branch.
Figure 4A:
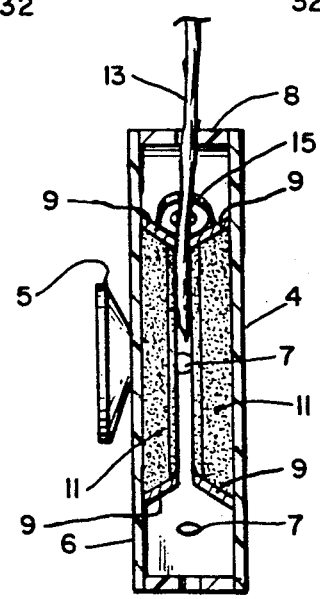
FIG. 4a is a cutaway side elevation view of the invention taken along the line 4a—4a of FIG. 3a, and particularly showing the addition of circular spring clips around the internal watering pads.

In addition to the porous pads 11, it may be desired to use other means of gripping the flower stems or branches. This could particularly apply if a relatively large number of flower stems or large branches are to be arranged. In this case, as depicted in FIGS. 3a and 4a, spring clips 9 and pincer devices 15 may be added. Referring to FIGS. 3a and 4a, there is shown a representation of how the spring clips and pincers are incorporated in the shell. Around the pads 11 are placed two circular plastic spring clips 9. These spring clips 9 have a width such that two will occupy the depth of the stand as shown in FIG. 4a, leaving only a small space between them for gripping a flower or stem or branch 13. The spring clips 9 will stay in position primarily due to the pads 11 on which they rest. However, for greater security, they may also be glued on one edge to a shell face 4, 6. The pincers devices, one of which 15 is illustrated in FIG. 3a, are located inside the shell in the space between the circumferential strip and the spring clips 9, and glued to the shell in line with a stem hole 7. The pincer 15 grasps a stem in two places along its length, providing a grip which supplements the spring clips 9 and the pads 11.

The preferred embodiment configuration illustrated in FIGS. 2, 3, 3a, 4 and 4a may also be held vertically by means other than the suction cup 5 shown in FIG. 2. A rigid polystyrene sheet plastic base, 1/16 inch thick may be used, attached by glue or suitable adhesion to a part of the shell 1 circumferential strip 8. There are no restrictions on the shape of the base, except that is should have sufficient area to maintain the shell stable and upright, preventing tipping over.

Figure 5:
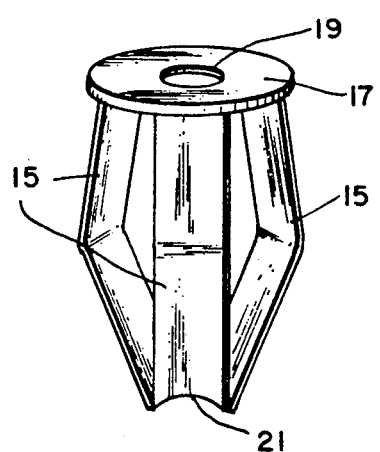
Figure 5A:
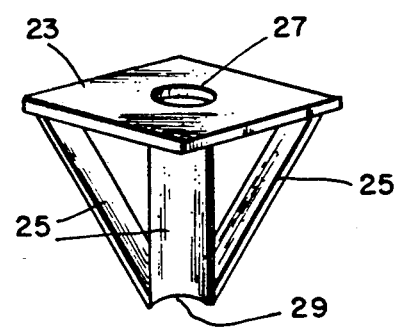
Figure 10:
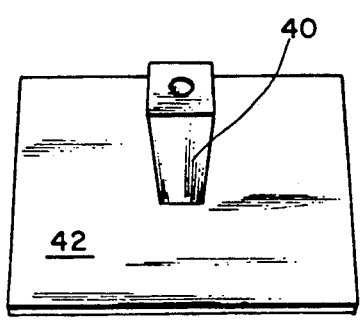
FIGS. 10, 11, 12 and 13 are front perspective views of other configuration embodiments of the present invention; particularly showing examples of the variety of shapes possible, using the same basic construction for the device.

Referring now to FIGS. 5 and 5a, there are shown two different configurations of pincers which may be used inside the shells of the flower stands to grasp flower stems or branches. In FIG. 5, the pincer has three or more curved legs 15 which are separately glued to a circular top piece 17 at one end, and come together at their other ends. A first hole 19 is cut in the center of the top piece 19, and a second hole 21 is formed at the bottom by the pincer legs 15 coming together. A flower stem or branch 13 is inserted through the first hole 19 and through the second hole 21.

Each curved leg 15 is stiff enough to maintain a grip on a stem 13 at its bottom 21 as desired.

As shown in FIG. 5a, the alternate pincer design comprises a rectangular or square shaped top piece 213, and four pincer legs 25. The pincer legs 25 are each separately glued at one end to the outer edges of the top piece 23 and come together at the bottom, forming a first hole 29. A second hole 27 is cut in the center of the top piece 13 and sized for insertion of a stem 13 or branch. In this pincer configuration, the pincer legs 25 are straight instead of being curved. However, they are also stiff enough to maintain a grip on a stem 13 at their bottom end 29 where they come together in a clamp.

Both the pincer configurations are typically made of polystyrene plastic or equivalent material sheet. They may however, alternately be formed in one piece instead of being composed of several pieces glued together, depending on the economics of manufacture.

Referring now to FIGS. 6, 7, 8 and 9, there are shown in views of an alternate embodiment of the present invention. As shown in the front perspective view of FIG. 6, the shell 30 is shaped in a curved wedge or slice, and is supported by a rectangular shaped base 32. A multiplicity of holes 34 in the curved portion of the shell 30 circumference provide an entry for flower stems or branches as well as watering holes.

The shell 30 is made of polystyrene plastic sheet or equivalent plastic material and formed by glueing the two half moon shaped faces 31 to the edge circumferential strip to form an enclosure.

In the center of the shell 30 and forming its core, are located two porous pads 38 and two curved spring clips 36. As shown in the front cutaway view of FIG. 8, each porous pad 38 is shaped to conform to the shell 30 face, and each curved spring clip 36 is fitted around a porous pad 38 edge. The spring clips 36 are each glued on one edge to a face of the shell 30 and made wide enough to fill the inside depth of the shell 30, leaving a small space for gripping flower stems between the strips 36. Each porous pad 38 is glued to either the front or back face 31 of the shell 30 and sized so that when the shell 30 is completely assembled, a small space exists between the two pads, sufficient to grasp and hold a stem or branch. This porous pad configuration acts as a watering means for the flower stems and branches in the same way as the previously described configuration, retaining fluids and giving up moisture to the stems as required, while also holding them in place.

Referring now to FIGS. 10, 11, 12 and 13, there are shown examples of the variety of pleasing floral stand shell shapes that are available, using the same shell and vertical watering dish construction described for the preferred and alternate embodiments. Depending on the shape of the floral stand shell selected, two or more watering porous pads would be needed and glued inside the shell. For example, in the cross configuration of FIG. 12, a total of at least six pads would be used; two long pads facing each other and two pads in each of the two cross legs. The pads would be located inside the shell, so that a stem thrust through any top hole would be grasped between two pads and watered. Spring clips and or pincer devices such as depicted in FIGS 3a, 8, 5 and 5a could also be incorporated as desired to assist in holding flower stems and branches.

The variety of flower arrangements permissible is obvious. In the floral stand configuration shown in FIG. 10, for example, only one flower stem or branch would be placed in the shell 40. A base 42 attached to the vertical shell 40 maintains the shell and flower upright.

Figure 11:
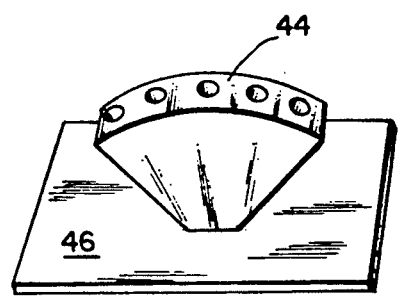

The configuration shown in FIG. 11 may be thought of as being a shell segment 44 of the alternate embodiment illustrated in FIG. 6. Here, a number of flower stems or branches can be displayed.

Figure 12:
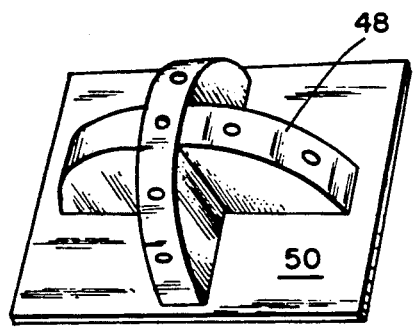
Figure 13:
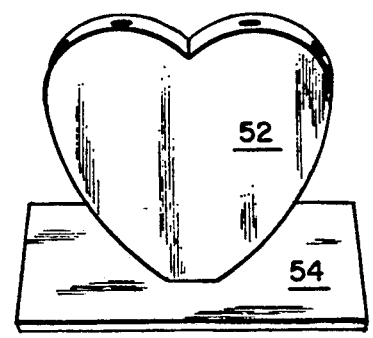

The flowers can be arranged in a cross using the shell 48 configuration shown in FIG. 12 or in a heart shaped outline, using the shell 52 configuration shown in FIG. 13.

Other configurations will come to mind, depending on the imagination of the user. It is expected that florists and flower arrangers, upon discovering the floral stand possibilities, will come up with a myriad of stand shell configurations.

From the foregoing description of the present invention, a number of attributes and advantages are apparent. These include the following:
- a) No additional watering dish or vase is needed.
- b) The floral stand can be used to display flowers and/or branches in any convenient orientation, including upside down.
- c) The floral stand can hold one flower or branch, or many in a variety of arranged patterns depending on the design of the shell and the stand size.
- d) the floral stand is light in weight and resistant to breakage if dropped.
- e) The stand simple construction and use of materials lend themselves to an economic manufacture.

As such it is believed that the objects of the invention have been achieved, and the invention is a worthy improvement of the prior art.

Various modifications may be made in the construction of the device described above. These changes, which are in accordance with the spirit of this invention, come within the scope of the appended claims and are embraced thereby.

Having described the invention, what is claimed is:

1. A flower holding stand comprising:
   (a) a hollow shell, shaped in any pleasing configuration for flower and ranch display; said shell having cut in its circumferential strip or outer edge, a multiplicity of holes which are sized to accommodate flower or branch stems;
   (b) a watering means inside said hollow shell, said means comprising two or more pads made of a water porous material, said pads each being located inside said hollow shell and glued to an opposite inner face of said shall; said pads having a thickness sized so that a small space, sufficient to grip a flower stem or branch is left between said pads; said pads being oriented inside said hollow shell so that said space between them is lined up with said multiplicity of holes in said shell to permit insertion of flower stems through said holes and between said pads;
   (c) two or more spring clips inside said shell to assist in gripping flower stems or branches; said spring clips being made of flexible strips of polystyrene plastic, sized and shaped to fit around the edges of said porous pads, and glued on one edge of each clip to an opposite inner face of said shell, leaving a small space sufficient for a flower stem between each spring clip; and
   (d) a means for holding said shell upright, attached to said shell;
   said hollow shell being made from polystyrene plastic sheet or equivalent plastic material for light weight; said porous pads and spring clips acting to grip said flower or branch stems and watering them independent of the orientation of said shell and flower arrangement, whether horizontal or vertical.

2. The flower holding stand of claim 1, wherein said means for holding said shell upright includes a rigid base of polystyrene plastic sheet or equivalent material glued to a portion of said shell; said base being sized in area sufficient to maintain said shell stable and upright, preventing tipping over.

* * * * *